(12) United States Patent
Zou et al.

(10) Patent No.: US 10,144,614 B2
(45) Date of Patent: Dec. 4, 2018

(54) POWER-LOSS TRIGGERING DEVICE

(71) Applicant: HANGZHOU HUNING ELEVATOR PARTS CO., LTD., Hangzhou, Zhejiang (CN)

(72) Inventors: Jiachun Zou, Zhejiang, CA (US); Rongkang Yao, Zhejiang, CA (US); Lingming Lu, Zhejiang (CN); Xin He, Zhejiang (CN); Dong Yang, Zhejiang (CN)

(73) Assignee: HANGZHOU HUNING ELEVATOR PARTS CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/121,767

(22) PCT Filed: Aug. 6, 2015

(86) PCT No.: PCT/CN2015/086258
§ 371 (c)(1),
(2) Date: Aug. 25, 2016

(87) PCT Pub. No.: WO2016/095536
PCT Pub. Date: Jun. 23, 2016

(65) Prior Publication Data
US 2017/0283214 A1    Oct. 5, 2017

(30) Foreign Application Priority Data

Dec. 17, 2014    (CN) .......................... 2014 1 0787069
Dec. 17, 2014    (CN) .................... 2014 2 0804672 U
Dec. 17, 2014    (CN) .................... 2014 2 0804674 U (51) Int. Cl.
*B66B 5/02*    (2006.01)
*F16D 65/14*    (2006.01)
(Continued)

(52) U.S. Cl.
CPC .................. *B66B 5/02* (2013.01); *B66D 5/16* (2013.01); *B66D 5/30* (2013.01); *F16D 65/14* (2013.01); *B66D 2700/03* (2013.01)

(58) Field of Classification Search
CPC . E05Y 2201/21; E05Y 2201/266; B66B 1/28; B66B 5/02; B66B 5/04; B66B 5/24;
(Continued)

(56) References Cited

U.S. PATENT DOCUMENTS 2,939,555 A  *  6/1960  Flury ....................... B66D 5/00
                                                              188/171
4,227,825 A  *  10/1980  Oesterle .................. F16D 49/08
                                                              403/322.1
(Continued)

FOREIGN PATENT DOCUMENTS

CN            2753700 Y        1/2006
CN            2793028 Y        7/2006
(Continued)

OTHER PUBLICATIONS

International Search Report of PCT Patent Application No. PCT/CN2015/086258 dated Nov. 12, 2015.

*Primary Examiner* — Robert A. Siconolfi
*Assistant Examiner* — San M Aung
(74) *Attorney, Agent, or Firm* — NK Patent Law (57) ABSTRACT

The invention discloses a power-loss triggering device, including: a frame, an electromagnet and an impact bar; the impact bar vertically and movably penetrates through the frame; an energy storage piece is arranged and the energy storage piece may exert a downward action force on the impact bar; when the electromagnet is energized, the impact bar is positioned through electromagnetic force; when the electromagnet loses power, the impact bar loses a holding power from the electromagnet and conducts a downward impact movement under the action force of the energy (Continued)

storage piece. The power-loss triggering device is implemented through the electromagnet and an intermediate mechanism. In this invention, the electric current, the energy consumption and the cost of the electromagnet are reduced, the service life of the long-time energized electromagnet is prolonged.

16 Claims, 8 Drawing Sheets

(51) Int. Cl.
  *B66D 5/16* (2006.01)
  *B66D 5/30* (2006.01)
(58) Field of Classification Search
  CPC .. B66B 5/185; B66D 5/00; B66D 5/14; B66D 5/16; B66D 5/30; B66D 2700/03; F16D 49/08; F16D 49/16; F16D 49/20; F16D 55/28; F16D 59/02; F16D 2055/0058; F16D 2065/383; F16D 2121/22; D03D 51/10; Y10T 403/591
  USPC .................................................. 188/171, 291
  See application file for complete search history.

(56) References Cited

U.S. PATENT DOCUMENTS

| | | | |
|---|---|---|---|
| 4,493,479 A | 1/1985 | Clark | |
| 7,723,936 B2 | 5/2010 | Schaefer | |
| 2007/0007083 A1* | 1/2007 | Husmann | B66B 5/20 |
| | | | 187/366 |
| 2007/0051563 A1* | 3/2007 | Oh | B66B 5/06 |
| | | | 187/371 |

FOREIGN PATENT DOCUMENTS

| | | | |
|---|---|---|---|
| CN | 1955103 A | * | 5/2007 |
| CN | 2897975 Y | | 5/2007 |
| CN | 101096252 A | | 1/2008 |
| CN | 101531330 A | | 9/2009 |
| CN | 104528574 A | | 4/2015 |
| CN | 104555789 A | | 4/2015 |
| CN | 204310760 U | | 5/2015 |
| CN | 204310761 U | | 5/2015 |
| JP | 2007176610 A | | 7/2007 |

* cited by examiner

POWER-LOSS TRIGGERING DEVICE

TECHNICAL FIELD

The present invention pertains to the field of mechanical manufacturing technologies, relates to a device for triggering a steel rope brake used in an elevator, and more particularly, to a power-loss triggering device.

BACKGROUND

At present, a power-on triggering manner is used for triggering a latch hook of a steel rope brake used in an elevator. However, the power-on triggering control manner has a disadvantage that a triggering device is unable to trigger a switch (latch hook) mechanism of a brake in case that external power is lost, a back up supply is insufficient, or a circuit or device goes wrong, and thus it has a high safety risk degree. Specifically speaking, a power-on triggering manner has long safety chains along vertical and horizontal directions. In the vertical direction, a safety chain formed by a power supply, a control logic unit, an electromagnet, a back-up power supply and a triggering device. In the horizontal direction, in a power-on triggering process, failure detecting and monitoring links are more, and it is relatively difficult to implement failure-free monitoring feedback, where a brake is unable to pick up as long as one link goes wrong because this may cause a fatal risk that a switch (locking) mechanism is failed in turning on; meanwhile, the power-on triggering is larger in sustained current, and larger in capacity required for a back-up power supply, slow in system response, and high in power consumption.

SUMMARY

In order to overcome the disadvantage of the prior art, the present invention provides a power-loss triggering device, which has a larger action force to turn on a switch (locking) mechanism under a premise of obtaining a larger stroke with a smaller electromagnetic force, thereby solving the problem of turning on the switch (locking) mechanism under a power-loss state.

The present invention is implemented by means of the following technical solution: a power-loss triggering device, including: a frame, an electromagnet and an impact bar; the impact bar vertically and movably penetrates through the frame, an upper end and a lower end of the impact bar are respectively located outside the frame, an upper section of the impact bar is provided with a limiting buffer cushion, and a lower end is an impact end; the electromagnet is installed on the frame; an energy storage piece is arranged and the energy storage piece may exert a downward action force on the impact bar; when the electromagnet is energized, the impact bar is positioned through electromagnetic force; when the electromagnet loses power, the impact bar loses a holding power from the electromagnet and conducts a downward impact movement under the action force of the energy storage piece.

Preferably, the frame is shaped like a square frame body, and a rear side face of the frame is fixedly connected with a rear plate.

Preferably, an upper edge and a lower edge of a front face of the frame are each provided with a pin hole for installing a pin, and a cover plate is fixedly mounted on the side face through the pins.

Preferably, a housing of the electromagnet is fixedly mounted on the frame.

Preferably, the lower end of the impact bar is provided with an impact bolt, and an upward side of the impact bolt is provided with a buffer cushion or a check ring.

Preferably, the energy storage piece is a spring; a lower section of the impact bolt is externally sleeved with the spring, and upper and lower end faces of the spring are respectively propped to a lower surface of the frame, the buffer cushion or the check ring.

Preferably, the spring is externally sleeved with a spring pocket, a lower end of the spring pocket is disposed on the buffer cushion or the check ring, and a height of the spring pocket is smaller than a length of the spring under a normal state.

Preferably, the upper end of the impact bar is fixedly connected with a pull ring.

Preferably, the upper end of the impact bar forms a pull ring hole, and the impact bar is fixedly connected with the manual pull ring through the pull ring hole.

Preferably, two sides of the frame are respectively provided with the electromagnet, and the two electromagnets are symmetrically mounted at the two sides of the frame.

Preferably, the impact bar forms two downward inclined planes arranged in the frame, an upper part and a lower part of the inclined planes of the impact bar respectively are a guide surface and an electromagnetic pull-in surface, a width of the electromagnetic pull-in surface is smaller than that of the guide surface; an electromagnetic shaft of the electromagnet movably penetrates through the frame, and an inner end face faces the electromagnetic pull-in surface at a same side of the impact bar, this end of the electromagnetic shaft forms an inclined plane, and the inclined plane of the electromagnetic shaft fits with an inclined plane at the same side of the impact bar; when the electromagnet is energized, horizontal electromagnetic force is generated by forming a magnetic circuit by an end face of the electromagnetic shaft and the electromagnetic pull-in surface of the impact bar, and the impact bar is locked by the electromagnetic shaft propping against corresponding inclined planes at two sides of the impact bar.

Preferably, the electromagnetic shaft forms an upward stepped surface which transits to the inner end face of the electromagnetic shaft by means of the inclined plane of the electromagnetic shaft.

Preferably, the electromagnetic shaft movably penetrates through a winding frame, two ends thereof penetrate through the winding frame enwound by a coil, and the winding frame is mounted inside the housing of the electromagnet.

Preferably, an inner end of the electromagnetic shaft is provided with a flux-insulation limit ring which is arranged at one side of the stepped surface, an inward side face of the flux-insulation limit ring is provided with a retainer ring externally sleeved on the electromagnetic shaft; an outward side face of the flux-insulation limit ring is opposite to one side face of the winding frame, and after moving together with the electromagnetic shaft, the flux-insulation limit ring may attach to or break away from a corresponding side face of the winding frame.

Preferably, an upper side and a lower side of the frame each is provided with a hole, and a shape of the hole fits with that of a corresponding section of the impact bar.

Preferably, the impact bar is provided with a wedge block positioned in the frame, two sides of the wedge block respectively form a downward inclined plane; a bottom edge of the frame is provided with two oscillating support rods, an upper part of the support rod forms an inclined plane of the support rod which fits with the inclined plane at the same side of the wedge block; the inner end of the electromagnetic shaft of the electromagnet rotates and fits with the upper side of the support rod; under an action of the electromagnetic shaft, the support rod maintains a vertical state, and the impact bar is locked by the inclined plane of the support rod coming into contact with the inclined plane of the wedge block.

Preferably, the upper part of the support rod forms a support rod groove; the inner end of the electromagnetic shaft forms a groove notch which is movably sandwiched between two sides of the support rod, and the groove notch is provided with a support rod pin which is rotatably placed into the support rod groove.

Preferably, the support rod is mounted on the bottom edge of the frame by means of a rotating shaft of the support rod.

Preferably, the rotating shaft of the support rod is provided with two spacer bushes disposed at two sides of the support rod to relatively fix the support rod to a middle position.

Preferably, the housing of the electromagnet is fixedly mounted in the frame by means of a mounting plate.

Preferably, the housing of the electromagnet is internally provided with a coil former, and the electromagnetic shaft movably penetrates through the coil former and the mounting plate.

Preferably, an external port of the housing of the electromagnet fixes an end cover.

Preferably, the housing of the electromagnet is internally provided with a pull-in disk, a first side face of the pull-in disk faces an inner side face of the end cover; and a second side face of the pull-in disk faces one end of the electromagnetic shaft.

Preferably, the second side face of the housing of the electromagnet forms a raised conical surface, and a corresponding end part of the electromagnetic shaft forms a taper hole which fits with the conical surface of the pull-in disk.

It is found through document retrieval of the prior art, all existing steel rope brake triggering mechanisms adopt the power-on triggering manner. In terms of reducing safety control risk, a power-loss triggering safety is better. It is relatively easy to implement power-loss triggering having small stroke and small action force. However, to large stroke and large action force, it cannot be implemented by a high-power electromagnet in a long-term power-up state. The high-power electromagnet brings large current and high calorific capacity, and thus a required back-up power supply is large in capacity, high in power consumption, and easy to cause overheating damage. For this reason, the present invention adopts a manner of direct pull-in of the electromagnet and a manner of the electromagnet and the intermediate mechanism to solve the problem of power-loss triggering in terms of low risk, small electric current, low energy consumption, small size, low cost and long life.

Figure 1:
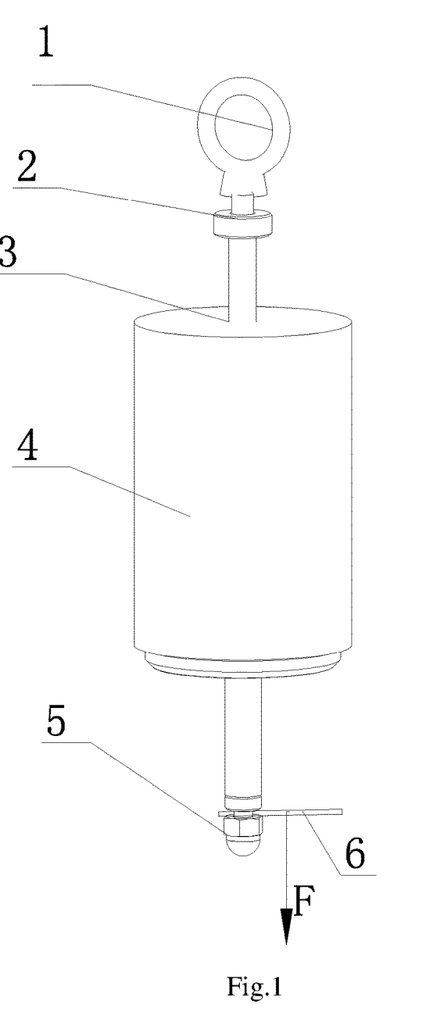
FIG. 1 is a schematic diagram of a principle structure of a triggering manner which is an electromagnet and a switch (locking) mechanism.
Figure 2:
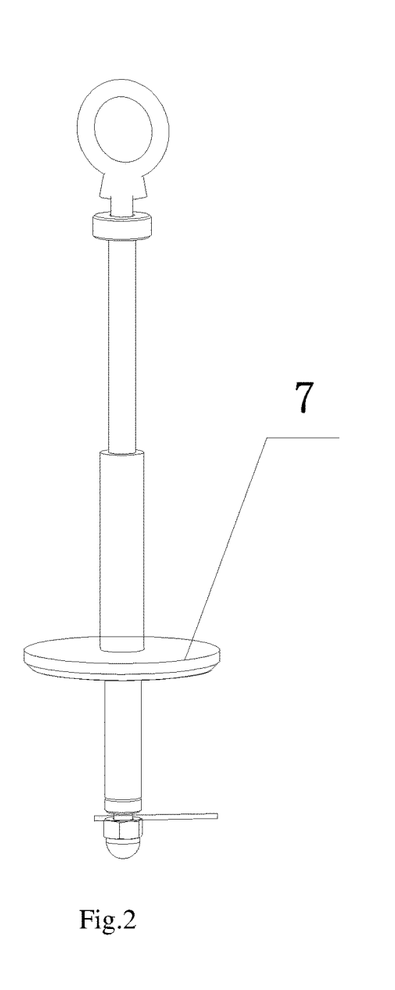
FIG. 2 is a schematic local diagram of a principle structure of a triggering manner which is an electromagnet and a switch (locking) mechanism.
Figure 3:
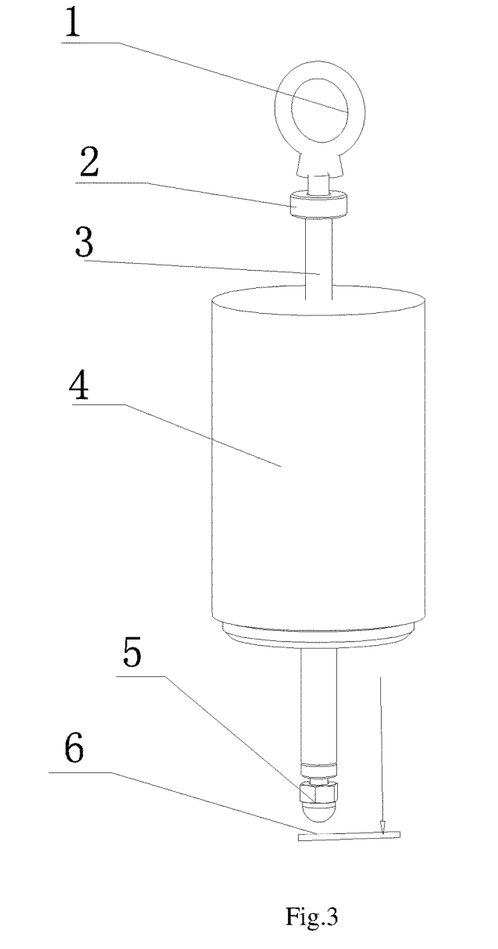
FIG. 3 is a schematic diagram of a principle structure of a triggering manner which is an electromagnet and an energy storage impact mechanism.
Figure 4:
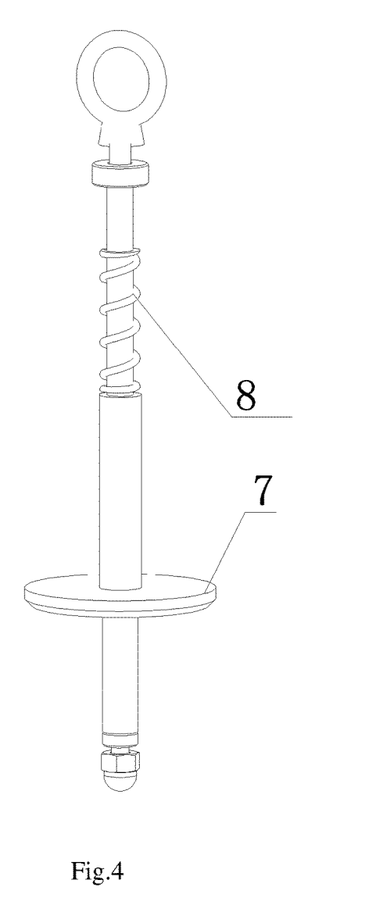
FIG. 4 is a schematic local diagram of a principle structure of a triggering manner which is an electromagnet and an energy storage impact mechanism.

The manner of direct pull-in of the electromagnet in the present invention mainly adopts two implementation manners: a manner of the electromagnet and the switch (locking) mechanism and a manner of the electromagnet and the energy storage impact mechanism, where in the manner of electromagnet and the switch (locking) mechanism, the switch is directly picked up and locked by means of the electromagnet, and when the electromagnet loses power, the switch is automatically turned on by relying on the action force of a locked object (FIGS. 1 and 2). In the manner of the electromagnet and the energy storage impact mechanism, the electromagnet and the energy storage impact mechanism are incorporated into a whole body. In design, the iron core of the electromagnet and the energy storage impact mechanism are incorporated into a whole body (FIGS. 3 and 4). When the electromagnet loses power, the switch (locking) mechanism is turned on by means of impact of the impact bar.

To the power-loss triggering, safety chains are short in vertical and horizontal directions as long as a monitoring and executing unit is failure-free and a double redundancy design is used to solve a faulty action. Therefore, the trigger control safety risk and monitor control cost are greatly reduced. A trigger mechanism using the power-loss triggering manner needs to maintain an energy storage state for a long time. It is a key point to solve power-loss triggering by solving the problem of small electric current, low power consumption, small size, and automatic electromagnetic resetting under large stroke and large action force.

The power-loss triggering device is implemented through the electromagnet and an intermediate mechanism. The electromagnetic force of the electromagnet is reduced through the intermediate amplifying mechanism, so that the electric current, the energy consumption and the cost of the electromagnet are reduced, the service life of the long-time energized electromagnet is prolonged, and automatic resetting of the electromagnet is achieved. Furthermore, the electromagnet, an energy storage impact structure and a reset structure of the power-loss triggering device are simple, and convenient for implementation.

In FIGS. 1-4: 1 manual pull ring, 2 limiting buffer cushion, 3 impact bar, 4 electromagnet, 5 impact bolt, 6 switch (locking mechanism), 7 pull-in disk, and 8 energy storage (impact) spring.

Figure 5:
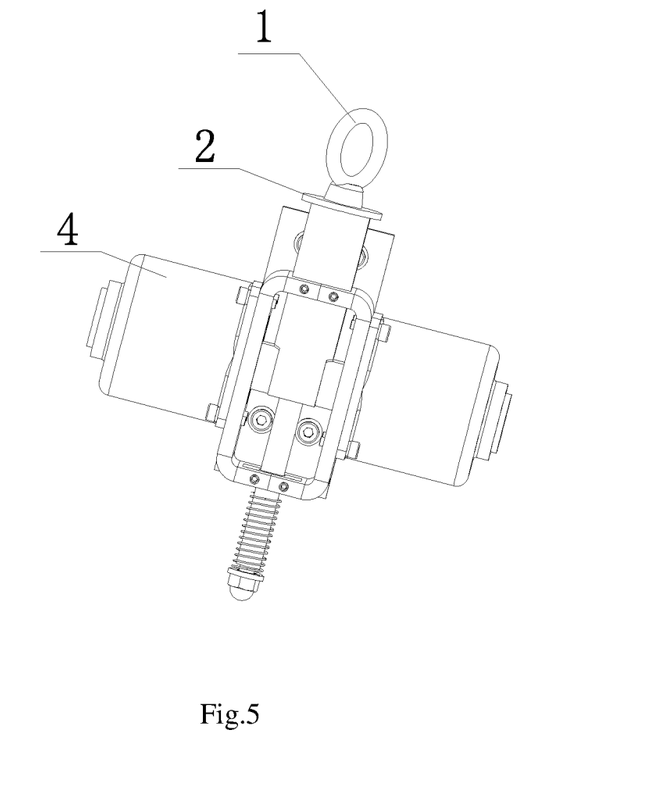
FIG. 5 is a structural outline drawing according to Embodiment I.
Figure 6:
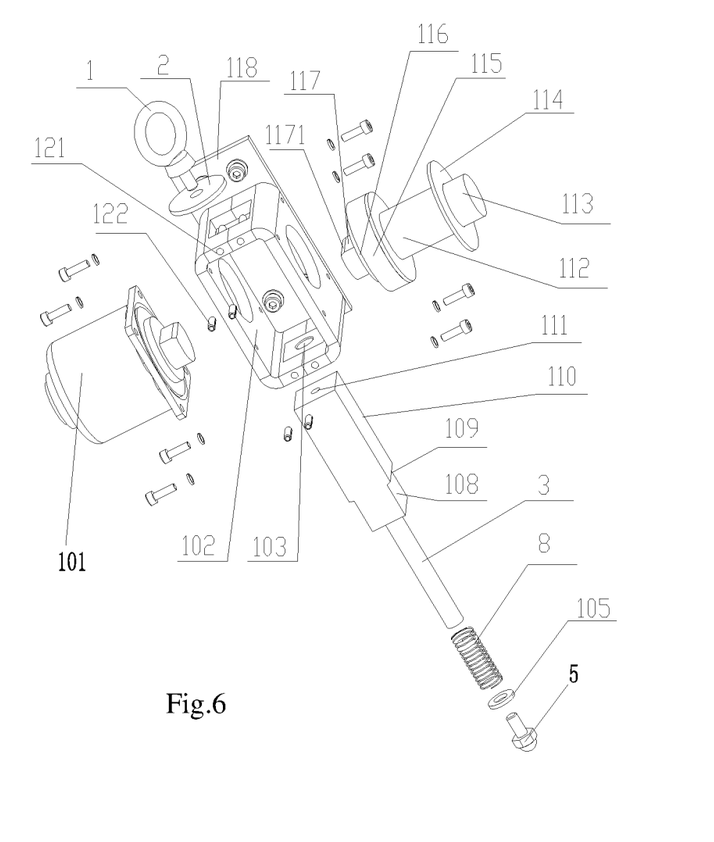
FIG. 6 is an exploded view of local structure according to Embodiment I.

In FIGS. 5-6: 1 manual pull ring, 2 limiting buffer cushion, 3 impact bar, 4 electromagnet, 5 impact bolt, 8 energy storage (impact) spring, 101 electromagnet housing, 102 frame, 103 lower guide hole, 105 buffer cushion, 108 electromagnetic pull-in surface, 109 pushing inclined plane, 110 guide surface, 111 pull ring hole, 112 coil, 113 electromagnetic shaft, 114 winding frame, 115 flux-insulation ring, 116 retainer ring, 117 stepped surface of the electromagnetic shaft, 1171 inclined plane of the electromagnetic shaft, 118 rear plate, 121 pin hole and 122 pin.

In FIGS. 7-10: 2-1 manual pull ring, 2-2 limiting buffer cushion, 2-3 impact bar, 2-4 electromagnet, 2-5 impact bolt, 2-8 energy storage spring, 2-9 frame, 2-10 wedge block, 2-11 support rod pin, 2-12 support rod, 2-13 check ring, 2-14 rotating shaft of the support rod, 2-15 pull-in disk, 2-16 electromagnet end cover, 2-17 spacer bush, 2-18 spring pocket, 2-19 electromagnetic shaft, 2-101 electromagnet housing, 2-102 electromagnet mounting plate, 2-103 coil former, 2-151 conical surface, 2-501 inclined plane of the support rod, and 2-502 support rod groove.

DETAILED DESCRIPTION OF THE EMBODIMENTS

The following describes in detail preferred embodiments of the present invention with reference to the accompanying drawings.

The triggering manner shown in FIGS. 1-2 is an electromagnet and a switch (locking) mechanism, and its principle is as below: when the electromagnet is energized, the pull-in disk is picked up by electromagnetic force onto the housing of the electromagnet, at the moment, the electromagnet overcomes a downward action force F of a switch and maintains the switch in an off state. When the electromagnet loses power, the switch loses a holding power, and thus the switch is turned on under the action of the action force F. In this manner, the switch is turned on by relying on the action force of the switch (locking) mechanism, intermediate control links are less, failure rate in a control process is lower, and safety is improved due to double redundancy design.

The triggering manner shown in FIGS. 3-4 is an electromagnet and an energy storage impact mechanism, and its principle is as below: a certain distance or contact is kept between the impact bar and the switch, when the electromagnet is energized, the pull-in disk is picked up by electromagnetic force onto the housing of the electromagnet, at the moment, the electromagnet overcomes the action force of an energy storage spring and maintains the impact bar to be locked and the switch in an off state. When the electromagnet loses power, the energy storage spring is released and drives the impact bar to move downward, so that the switch is turned on. In this manner, the switch (locking) mechanism is turned on by relying on the intermediate energy storage impact mechanism in a power-off state, intermediate control links are less, failure rate in a control process is lower, and safety is improved due to double redundancy design.

Embodiment 1

Referring to FIGS. 5-6, the frame 102 is shaped like a square frame body, and a rear side face of the frame is fixedly connected to a rear plate 118 to form a fixed mount. A left side and a right side of the frame 102 are respectively provided with a hole, an upper margin and a lower margin are also respectively provided with a hole, and a lower hole is a lower guide hole 103. Holes corresponding to the upper margin and the lower margin of the frame 102 fit with an external shape of the impact bar 3, the upper hole and the lower hole vertically penetrate through the impact bar 3, and the upper hole and the lower hole are used for guiding and installing the impact bar 3. The upper section of the impact bar 3 is shaped like a square column, and a side face is the guide surface 110 which is used for vertical guiding in a process of impacting and resetting. A middle section is also shaped like a square column, but a spacing (namely, width) between two side faces thereof is smaller than that of the upper section, the two side faces constitute an electromagnetic pull-in surface 108, a transition edge between the electromagnetic pull-in surface 108 and the guide surface 110 is the pushing inclined plane 109 which is shaped like an (valgoid) oblique surface. Two ends of the impact bar 3 are respectively disposed outside the frame 102. The upper end of the impact bar 3 forms a pull ring hole 111 which is fixedly connected with the manual pull ring 1, the upper section of the impact bar 3 is also provided with a limiting buffer cushion 2 which is arranged between the manual pull ring 1 and the upper margin of the frame 102. The lower end of the impact bar 3 is provided with an impact bolt 5, the upward side of the impact bolt 5 is provided with a buffer cushion 105, the impact bolt 5 is connected to the switch, and under the action of downward force, the switch is connected to the impact bar 3 by means of the impact bolt 5.

The lower section of the impact bar 3 is externally sleeved with an impact spring 8, and an upper end surface and a lower end surface of the spring 8 are respectively propped to the lower surface of the frame 102 and the buffer cushion 105.

An upper edge and a lower edge of a front face of the frame 102 are each provided with a pin hole 121 for installing a pin 122, and a cover plate is fixedly mounted on the side face through the pins.

Two side faces of the frame 102 are respectively provided with an electromagnet 4 which is fixedly mounted on the frame 102 by means of a housing 101. An electromagnetic shaft 113 movably penetrates through one side face hole of the frame 102, and an inner end face thereof faces the impact bar 3, the electromagnetic shaft 113 forms an upward stepped surface 117, and the stepped surface 117 transits to the inner end face of the electromagnetic shaft 113 by means of the inclined plane 1171. The electromagnetic shaft 113 movably penetrates through a winding frame 114, two ends thereof penetrate through the winding frame 114 enwound by a coil 112, and the winding frame 114 is fixedly mounted inside the housing 101 of the electromagnet. An inner end of the electromagnetic shaft 113 is provided with a flux-insulation limit ring 115 which is arranged at one side of the stepped surface 117 (far from the inner end face), an outward side face of the flux-insulation limit ring 115 is opposite to one side face of the winding frame 114, after moving together with the electromagnetic shaft 113, the flux-insulation limit ring 115 may attach to or break away from a corresponding side face of the winding frame 114; and an inward side face of the flux-insulation limit ring 115 is provided with a retainer ring 116 externally sleeved on the electromagnetic shaft 113.

When the electromagnet is energized, horizontal electromagnetic force is generated by forming a magnetic circuit by an end face of the electromagnetic shaft 113 and the electromagnetic pull-in surface 108 on the impact bar 3. After the impact bar 3 is upward reset, the position of the impact bar 3 is limited by the pushing inclined plane 109 of the impact bar 3 coming into contact with the inclined plane 1171 of the electromagnetic shaft 113, so that the impact bar 3 is locked and the impact spring 8 is in a state of compression.

After the electromagnet loses power, electromagnetic force is lost, the compressed spring 8 on the impact bar 3 generates a restoring force to form a downward driving force on the impact bar 3, the inclined plane 1171 of the electromagnetic shaft 113 is pushed by a component force generated by the pushing inclined plane 109, which drives the electromagnetic shaft 113 to move outward horizontally, so that the impact bar 3 is unlocked, at the moment, under the action of the impact spring, the impact bar 3 moves downward to turn on the switch (locking) mechanism.

Under the action of an external force (automatically or manually resetting) applied on the impact bar 3, the electromagnet is energized, electromagnetic force is generated by the electromagnetic pull-in surface 108 of the impact bar 3 and the inner end face of the electromagnetic shaft 113, so that the electromagnetic shaft 113 horizontally moves toward the impact bar 3 and is picked up together with the impact bar 3, the impact bar 3 is locked by the inclined plane 1171 of the electromagnetic shaft 113 coming into contact with the pushing inclined plane 109 of the impact bar 3.

The electromagnet is automatically reset, after the impact bar 3 impacts and turns on the switch, the electromagnetic shaft 113 horizontally moves outward, at the moment, the automatic pull-in amount of clearance of electromagnetic force is guaranteed by position limiting; or the a spring is applied to the electromagnetic shaft to push the electromagnetic shaft 113 to horizontally get close to the impact bar, thus ensuring that the electromagnet to automatically pick up. In the solution of this embodiment, automatic resetting may be implemented through the electromagnet by a smaller stroke, and safety is improved due to a double redundancy design.

Embodiment 2

Referring to FIGS. 7-10, the frame 2-9 is shaped like a square frame body, the impact bar 2-3 vertically and movably penetrates through the upper edge and the lower edge of the frame 2-9, two ends of the impact bar 2-3 are positioned outside the frame 2-9, the upper end of the impact bar 2-3 is fixedly connected with the manual pull ring 1-1, the upper section of the impact bar 2-3 is also provided with a limiting buffer cushion 2-2, and the limiting buffer cushion 2-2 is arranged between the upper margin of the frame 2-9 and the manual pull ring 2-1.

The bottom end of the impact bar 2-3 is provided with an impact bolt 2-5, the lower section of the impact bar 2-3 is also sleeved with an energy storage spring 2-8 and a check ring 2-13 which is placed on the impact bolt 2-5, and the upper end and the lower end of the spring 2-8 are respectively propped on the lower surface at the bottom edge of the frame 2-9 and the check ring 2-13.

The energy storage spring 2-8 is externally sleeved with a spring pocket 2-18, a lower end of the spring pocket 2-18 is disposed on the check ring 2-13, and the height of the spring pocket 2-18 is smaller than the length of the spring 2-8.

The middle section of the impact bar 2-3 is provided with a wedge block 2-10 which is arranged in the frame 2-9, and two sides of the wedge block 2-10 respectively form a downward inclined plane.

Two sides of the frame 2-9 are respectively provided with an electromagnet 2-4, and a housing 2-101 thereof is fixedly mounted on a side face of the frame 2-9 through a mounting plate 2-102.

Figure 10:
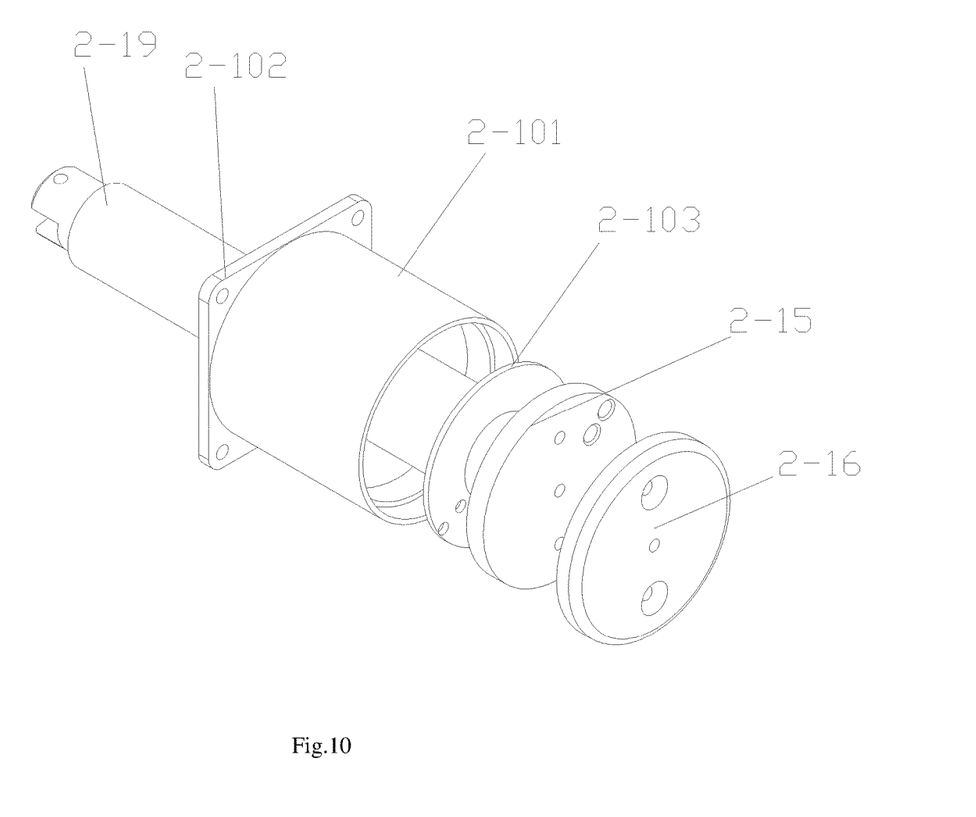
FIG. 10 is a structural drawing of an electromagnet according to Embodiment II.

An external port of the housing 2-101 of the electromagnet fixes an end cover 2-16. The housing 2-101 of the electromagnet is internally provided with a pull-in disk 2-15, a first side face of the pull-in disk 2-15 faces an inner side face of the end cover 2-16; and another side face thereof forms a raised conical surface 2-151. The housing 2-101 of the electromagnet is internally provided with a coil former 2-103, and the electromagnetic shaft 2-19 movably penetrates through the coil former 2-103 and the mounting plate 2-102, one end of the electromagnetic shaft forms a taper hole, this end faces the surface of the pull-in disk 2-15, and the taper hole thereof fits with the conical surface 2-151 of the pull-in disk, and a clearance of 1-2 mm is kept between both when the electromagnet is not energized. One side face of the pull-in disk (with a conical surface) faces one side face of the coil former 2-103. When the electromagnet is energized, electromagnetic force of the electromagnet picks the electromagnetic shaft up through the conical surface of the pull-in disk so that the electromagnetic shaft moves toward the direction of the support rod 2-12. The other end of the electromagnetic shaft 2-19 is arranged outside the housing 2-101 of the electromagnet.

Figure 7:
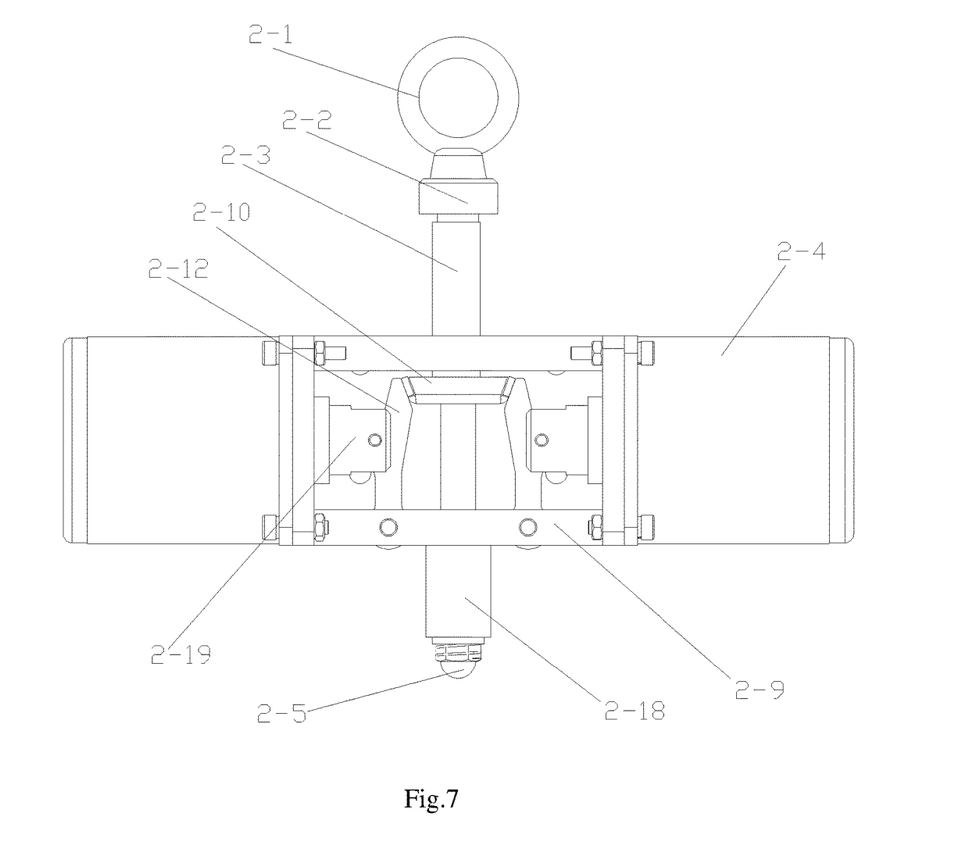
FIG. 7 is a structural outline drawing according to Embodiment II.
Figure 8:
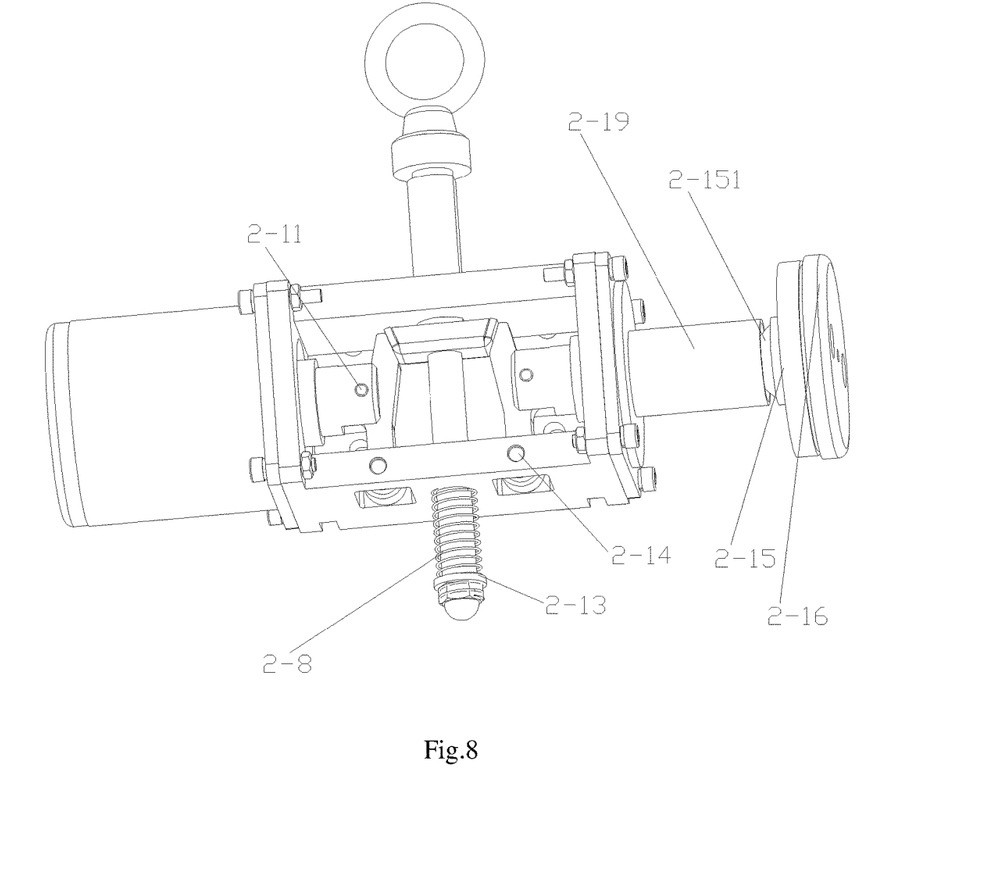
FIG. 8 is a partial structural diagram according to Embodiment II.
Figure 9:
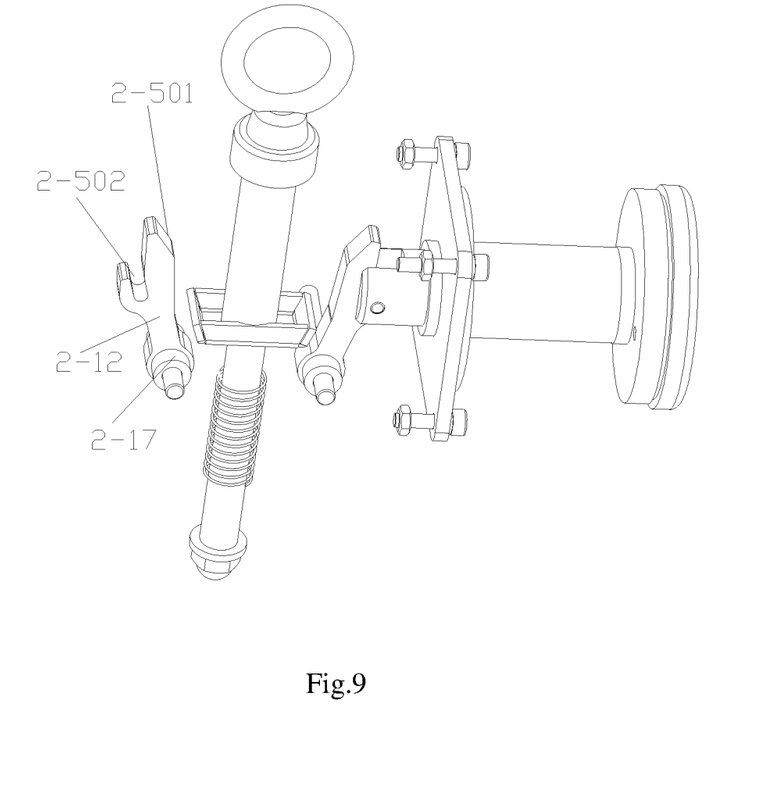
FIG. 9 is a local diagram of an internal structure according to Embodiment II.

Rotating shafts 2-14 of two support rods are mounted on the bottom edge of the frame 2-9, and the support rod 2-12 is mounted on the rotating shaft 2-14 of the support rod and can rotate on the rotating shaft 2-14 of the support rod. The rotating shaft 2-14 of the support rod is provided with two spacer bushes 2-17 disposed at two sides of the support rod 2-12 to relatively fix the support rod to a middle position. The upper part of the support rod forms a support rod groove 2-502 and an inclined plane 2-501 of the support rod. The inner end of the electromagnetic shaft 2-19 forms a groove notch which is movably sandwiched between two sides of the support rod 2-12, and the groove notch is provided with a support rod pin 2-11 which is rotatably placed into the support rod groove 2-502; the support rod groove 2-502 maintains a vertical state through the support rod pin 2-11 under the action of the electromagnetic shaft 2-19, and under the action of horizontal electromagnetic force, the impact bar is locked by the inclined plane 2-501 of the support rod coming into contact with the inclined plane of the wedge block 2-10, so that the impact bar is unable to conduct a downward impact movement.

When the manual pull ring or an automatic reset mechanism by external force enables the impact bar to move upward to a preset position, the electromagnet is energized and electromagnetic force is maintained to be acted on the support rod, by the inclined plane of the support rod coming into contact with the inclined plane of the wedge block, horizontal electromagnetic force is converted to action force along a vertical direction, so that the impact bar is locked, and the energy storage spring on the impact bar is maintained in a state of compression.

When the electromagnet loses power, the electromagnetic shaft loses action force in the horizontal direction, at the moment, under the action of the energy storage spring, vertical action force of the impact bar is converted by the inclined planes of the wedge block and of the support rod to horizontal action force to drive the electromagnetic shaft to move to two sides, and support of the impact bar is lost so that the impact bar has an impact effect on the switch (locking mechanism) under the action of the energy storage spring to turn on the switch. This embodiment is characterized in that magnetic resetting may be implemented at smaller electric current under larger electromagnetic stroke.

In the present invention, power-off triggering is implemented by means of a manner of direct pull-in of the electromagnet or a manner of the electromagnet and the intermediate mechanism. The power-loss triggering device in the present invention turns on the switch (locking mechanism) in a power-loss (power loss) state. In a normal power-up state, electromagnetic force is maintained by means of small electric current, low power consumption and long-term energization, so that the locking mechanism is triggered to be in a working state to store energy for the impact mechanism. In case of power loss (interrupt), electromagnetic force of the electromagnet is lost, and the energy storage impact mechanism is turned on by triggering the locking mechanism so as to turn on the switch (locking) mechanism. For resetting, the impact bar of the energy storage impact mechanism is pushed upward by means of the manual pull ring or the automatic reset mechanism to compress the energy storage spring; vertical action force is converted to horizontal electromagnetic force under the action of inclined planes to implement locking of the energy storage impact mechanism by the electromagnet in a power-up state. The power-loss triggering device in the present invention is small in electric current, low in power, quick in response, stable and controllable, convenient for installation, and low in manufacturing cost, etc.

The power-loss triggering device in the present invention turns on the switch (locking) mechanism by means of a power-loss triggering manner and has the advantages in that: the switch (locking) mechanism is safely turned on in a power loss (interrupt) state, thereby solving the practical problems that the original power-on triggering safety control chain is long, the safety control risk degree is high, the failure-free monitoring links are more, it is difficult to implement power-loss triggering because of large stroke and large action force, and it is difficult to automatically reset the electromagnet.

In the manner of direct pull-in of the electromagnet, when the electromagnet loses power, the switch (locking) mechanism is turned on by means of the energy storage impact mechanism. In the manner of the electromagnet and the intermediate mechanism, an amplifying mechanism is used to reduce the holding electromagnetic force, and when the electromagnet loses power, the switch (locking) mechanism is turned on by means of the energy storage impact mechanism. The power-loss triggering device in the present invention is low in risk, small in electric current, low in energy consumption, large in impact force and stroke, and it is solved the problem of safety control of the switch (locking) mechanism.

The above describes in details preferred embodiments of the present invention, however, to those of ordinary skill in the art, the embodiments may be changed in according with the thought provided by the present invention, and these changes shall also be regarded as the scope of protection of the present invention.

What is claimed:

1. A power-loss triggering device, comprising: a frame, an electromagnet and an impact bar, the impact bar vertically and movably penetrates through the frame, an upper end and a lower end of the impact bar are respectively located outside the frame, an upper section of the impact bar is provided with a limiting buffer cushion, and a lower end is an impact end; the electromagnet is installed on the frame; wherein an energy storage piece is arranged and the energy storage piece may exert a downward action force on the impact bar; when the electromagnet is energized, the impact bar is positioned through electromagnetic force; when the electromagnet loses power, the impact bar loses a holding power from the electromagnet and conducts a downward impact movement under the action force of the energy storage piece;

the impact bar forms two downward inclined planes arranged in the frame, an upper part and a lower part of the inclined planes of the impact bar respectively are a guide surface and an electromagnetic pull-in surface, a width of the electromagnetic pull-in surface is smaller than that of the guide surface; an electromagnetic shaft of the electromagnet movably penetrates through the frame, and an inner end face faces the electromagnetic pull-in surface at a same side of the impact bar, this end of the electromagnetic shaft forms an inclined plane, and the inclined plane of the electromagnetic shaft fits with an inclined plane at the same side of the impact bar; when the electromagnet is energized, horizontal electromagnetic force is generated by forming a magnetic circuit by an end face of the electromagnetic shaft and the electromagnetic pull-in surface of the impact bar, and the impact bar is locked by the electromagnetic shaft propping against corresponding inclined planes at two sides of the impact bar.

2. The power-loss triggering device of claim 1, wherein the frame is shaped like a square frame body, and a rear side face of the frame is fixedly connected with a rear plate, an upper edge and a lower edge of a front face of the frame are each provided with a pin hole for installing a pin, and a cover plate is fixedly mounted on the side face through the pins, a housing of the electromagnet is fixedly mounted on the frame.

3. The power-loss triggering device of claim 1, wherein the lower end of the impact bar is provided with an impact bolt, and an upward side of the impact bolt is provided with a buffer cushion or a check ring, the energy storage piece is a spring; a lower section of the impact bolt is externally sleeved with the spring, and upper and lower end faces of the spring are respectively propped to a lower surface of the frame, the buffer cushion or the check ring; the spring is externally sleeved with a spring pocket, and a lower end of the spring pocket is disposed on the buffer cushion or the check ring, and a height of the spring pocket is smaller than a length of the spring under a normal state.

4. The power-loss triggering device of claim 3, wherein the upper end of the impact bar is fixedly connected with a pull ring; the upper end of the impact bar forms a pull ring hole, and the impact bar is fixedly connected with the pull ring through the pull ring hole.

5. The power-loss triggering device of claim 1, wherein the upper end of the impact bar is fixedly connected with a pull ring; the upper end of the impact bar forms a pull ring hole, and the impact bar is fixedly connected with the pull ring through the pull ring hole.

6. The power-loss triggering device of claim 1, wherein two sides of the frame are respectively provided with the electromagnet, and the two electromagnets are symmetrically mounted at the two sides of the frame.

7. The power-loss triggering device of claim 1, wherein the electromagnetic shaft forms an upward stepped surface which transits to the inner end face of the electromagnetic shaft by means of the inclined plane of the electromagnetic shaft.

8. The power-loss triggering device of claim 1, wherein the electromagnetic shaft movably penetrates through a winding frame, two ends thereof penetrate through the winding frame enwound by a coil, and the winding frame is mounted inside the housing of the electromagnet.

9. The power-loss triggering device of claim 1, wherein an inner end of the electromagnetic shaft is provided with a flux-insulation limit ring which is arranged at one side of the stepped surface, an inward side face of the flux-insulation limit ring is provided with a retainer ring externally sleeved on the electromagnetic shaft; an outward side face of the flux-insulation limit ring is opposite to one side face of the winding frame, and after moving together with the electromagnetic shaft, the flux-insulation limit ring may attach to or break away from a corresponding side face of the winding frame.

10. The power-loss triggering device of any one of claim 6, wherein an upper side and a lower side of the frame each is provided with a hole, and a shape of the hole fits with that of a corresponding section of the impact bar.

11. A power-loss triggering device, comprising: a frame, an electromagnet and an impact bar, wherein the impact bar vertically and movably penetrates through the frame, an upper end and a lower end of the impact bar are respectively located outside the frame, an upper section of the impact bar is provided with a limiting buffer cushion, and a lower end is an impact end; the electromagnet is installed on the frame; an energy storage piece is arranged and the energy storage piece may exert a downward action force on the impact bar; when the electromagnet is energized, the impact bar is positioned through electromagnetic force; when the electromagnet loses power, the impact bar loses a holding power from the electromagnet and conducts a downward impact movement under the action force of the energy storage piece;

the impact bar is provided with a wedge block positioned in the frame, two sides of the wedge block respectively form a downward inclined plane; a bottom edge of the frame is provided with two oscillating support rods, an upper part of the support rod forms an inclined plane of the support rod which fits with the inclined plane at the same side of the wedge block; the inner end of the electromagnetic shaft of the electromagnet rotates and fits with the upper side of the support rod; under an action of the electromagnetic shaft, the support rod maintains a vertical state, and the impact bar is locked by the inclined plane of the support rod coming into contact with the inclined plane of the wedge block.

12. The power-loss triggering device of claim 11, wherein the upper part of the support rod forms a support rod groove; the inner end of the electromagnetic shaft forms a groove notch which is movably sandwiched between two sides of the support rod, and the groove notch is provided with a support rod pin which is rotatably placed into the groove of the support rod.

13. The power-loss triggering device of claim 11, wherein the support rod is mounted on the bottom edge of the frame by means of a rotating shaft of the support rod; the rotating shaft of the support rod is provided with two spacer bushes disposed at two sides of the support rod to relatively fix the support rod in a middle part.

14. The power-loss triggering device of claim 11, wherein the housing of the electromagnet is fixedly mounted in the frame by means of a mounting plate; the housing of the electromagnet is internally provided with a coil former, and the electromagnetic shaft movably penetrates through coil former and the mounting plate; an external port of the housing of the electromagnet fixes an end cover.

15. The power-loss triggering device of claim 11, wherein the housing of the electromagnet is internally provided with a pull-in disk, a first side face of the pull-in disk faces an inner side face of the end cover; and a second side face of the pull-in disk faces one end of the electromagnetic shaft.

16. The power-loss triggering device of claim 15, wherein the second side face of the housing of the electromagnet forms a raised conical surface, and a corresponding end part of the electromagnetic shaft forms a taper hole which fits with the conical surface of the pull-in disk.

\* \* \* \* \*